US012732872B2

(12) United States Patent
Godin et al.

(10) Patent No.: US 12,732,872 B2
(45) Date of Patent: Sep. 8, 2026

(54) RAN CONGESTION MANAGEMENT AND SERVICE CONTINUITY WITH USER CONSENT OPTION

(71) Applicant: Nokia Technologies Oy, Espoo (FI)

(72) Inventors: Philippe Godin, Versailles (FR); Rajesh Babu Natarajan, Bangalore (IN); Alessio Casati, West Molesey (GB); Srinivas Bandi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 596 days.

(21) Appl. No.: 18/247,284

(22) PCT Filed: Aug. 30, 2021

(86) PCT No.: PCT/EP2021/073866
§ 371 (c)(1), (2) Date: Mar. 30, 2023

(87) PCT Pub. No.: WO2022/069126
PCT Pub. Date: Apr. 7, 2022

(65) Prior Publication Data

US 2024/0015599 A1 Jan. 11, 2024

Related U.S. Application Data

(60) Provisional application No. 63/086,568, filed on Oct. 1, 2020.

(51) Int. Cl.
*H04W 36/00* (2009.01)
*H04W 48/18* (2009.01)

(52) U.S. Cl.
CPC ....... *H04W 36/0005* (2013.01); *H04W 48/18* (2013.01)

(58) Field of Classification Search
None
See application file for complete search history.

(56) References Cited

U.S. PATENT DOCUMENTS 10,608,895 B2 3/2020 Shaw et al.
2012/0207040 A1* 8/2012 Comsa .............. H04W 72/1215 370/252

(Continued)

FOREIGN PATENT DOCUMENTS

WO WO-2018135992 A1 * 7/2018 ............ H04W 48/18

OTHER PUBLICATIONS

Notice of Allowance received for corresponding European Patent Application No. 21769141.9, dated Mar. 20, 2024, 8 pages.

(Continued)

*Primary Examiner* — Hadi S Armouche
(74) *Attorney, Agent, or Firm* — Carter, DeLuca & Farrell LLP

(57) ABSTRACT

Methods and apparatus, including computer program products, are provided for congestion management and service continuity. In some example embodiment, there may be provided a method comprising sending, by a user equipment, an indication of whether the user equipment supports an automatic re-mapping of a network slice to a fallback network slice; and receiving, by the user equipment, an acknowledgment from a network in response to the sent indication. Related systems, methods, and articles of manufacture are also disclosed.

1 Claim, 12 Drawing Sheets

(56) References Cited

U.S. PATENT DOCUMENTS

| | | | | |
|---|---|---|---|---|
| 2017/0086118 | A1 | 3/2017 | Vrzic | |
| 2019/0200286 | A1 | 6/2019 | Usui et al. | |
| 2019/0223093 | A1 | 7/2019 | Watfa et al. | |
| 2020/0053619 | A1 * | 2/2020 | Sartori | H04W 36/0016 |
| 2020/0100137 | A1 | 3/2020 | Panchal et al. | |
| 2020/0137621 | A1 | 4/2020 | Yang et al. | |
| 2020/0195521 | A1 * | 6/2020 | Bogineni | H04W 36/26 |
| 2023/0086410 | A1 * | 3/2023 | Sun | H04W 48/18 370/254 |
| 2023/0098982 | A1 * | 3/2023 | Sun | H04W 36/06 |
| 2023/0345247 | A1 * | 10/2023 | Kahn | H04W 12/08 |
| 2024/0292301 | A1 * | 8/2024 | Naseer-Ul-Islam | H04W 36/0085 |
| 2025/0184880 | A1 * | 6/2025 | Cho | H04W 48/18 |
| 2026/0113786 | A1 * | 4/2026 | Koskela | H04W 74/0833 |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

"3rd Generation Partnership Project; Technical Specification Group Services and System Aspects; Procedures for the 5G System (5GS); Stage 2 (Release 16)", 3GPP TS 23.502, V16.5.0, Jul. 2020, pp. 1-594.

"3rd Generation Partnership Project; Technical Specification Group Radio Access Network; NG-RAN; NG Application Protocol (NGAP) (Release 16)", 3GPP TS 38.413, V16.2.0, Jul. 2020, pp. 1-462.

"3rd Generation Partnership Project; Technical Specification Group Core Network and Terminals; Non-Access-Stratum (NAS) protocol for 5G System (5GS); Stage 3; (Release 16)", 3GPP TS 24.501, V16.5.1, Jul. 2020, pp. 1-709.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"Study on enhancement of RAN Slicing", 3GPP TSG-RAN meeting #86, RP-193254, Agenda: 9.1.2, CMCC, Dec. 9-12, 2019, 4 pages.

"Solution on Network Slice Instance Reselection", SA WG2 Meeting #116BIS, S2-165256, Agenda: 6.10.1, LG Electronics Inc, Aug. 29-Sep. 2, 2016, pp. 1-9.

"IEEE 802.11", Wikipedia, Retrieved on May 31, 2023, Webpage available at : https://en.wikipedia.org/wiki/IEEE 802.11.

"IEEE 802.16", Wikipedia, Retrieved on May 31, 2023, Webpage available at : https://en.wikipedia.org/wiki/IEEE_802.16.

"IEEE 802.3", Wikipedia, Retrieved on May 31, 2023, Webpage available at : https://en.wikipedia.org/wiki/IEEE_802.3.

"IEEE 802.15", Wikipedia, Retrieved on May 31, 2023, Webpage available at : https://en.wikipedia.org/wiki/IEEE_802.15.

Invitation to Pay Additional Fees received for corresponding Patent Cooperation Treaty Application No. PCT/EP2021/073866, dated Dec. 6, 2021, 20 pages.

"Discussion on Xn based handover slice re-mapping", 3GPP TSG-RAN WG3 #109-e, R3-205362, Agenda: 15.2, CATT, Aug. 17-28, 2020, 4 pages.

"Discussion on slice re-mapping", 3GPP TSG-RAN3 Meeting #109-e, R3-205404, Agenda: 17.2, Samsung, Aug. 17-28, 2020, 8 pages.

"Service continuity for slicing", 3GPP TSG-RAN WG3 Meeting #109 electronic, R3-205440, Agenda: 17.2, CMCC, Aug. 17-28, 2020, 3 pages.

"Summary of Offline Discussion on Sicing Solutions", 3GPP TSG-RAN WG3 #109, R3-205730, Nokia, Aug. 17-27, 2020, 16 pages.

"Solution for RAN Congestion and Service Continuity", 3GPP TSG-RAN WG3#110, R3-206238, Agenda: 17.2, Nokia, Nov. 2-12, 2020, 6 pages.

International Search Report and Written Opinion received for corresponding Patent Cooperation Treaty Application No. PCT/EP2021/073866, dated Jan. 31, 2022, 27 pages.

"Correction CR on Network instance", 3GPP TSG-RAN WG3 #110-e, R3-206352, CATT, Nov. 2-12, 2020, 2 pages.

"Evaluation of Solutions for Slice Resource Shortage (Scenario 1)", 3GPP TSG-RAN WG3#111-e, R3-210693, Agenda: 17.2, Nokia, Jan. 25-Feb. 4, 2021, pp. 1-6.

"Evaluation of Solutions for Slice not supported at target (scenario 2)", 3GPP TSG-RAN WG3#111-e, R3-210694, Agenda: 17.2, Nokia, Jan. 25-Feb. 4, 2021, pp. 1-11.

"3rd Generation Partnership Project; Technical Specification Group RAN; NR; Study on enhancement of Radio Access Network (RAN) slicing (Release 17)", 3GPP TR 38.832, V17.0.0, Jun. 2021, pp. 1-31.

* cited by examiner

205

- UE1 has subscribed S-NSSAI as follows:
  - NS#1: S-NSSAI 1 – 50 Mbps (default S-NSSAI for the PLMN)
  - NS#2: S-NSSAI 2 – 100 Mbps
  - NS#3: S-NSSAI 3 – 150 Mbps
  - NS#4: S-NSSAI 4 – 100 Mbps
  - NS#5: S-NSSAI 5 – 200 Mbps

210

The list of “Slice fallback mapping”, the slice mapping configure by OAM in NG-RAN would be

| Allowed S-NSSAI | Fallback S-NSSAI |
|---|---|
| S-NSSAI 5 | S-NSSAI 4, (higher priority)<br>S-NSSAI 3 |
| S-NSSAI 4 | S-NSSAI 1 |
| S-NSSAI 3 | S-NSSAI 2 |
| S-NSSAI 2 | S-NSSAI 1 |

- UE1 has subscribed S-NSSAI as follows:
  - NS#1: S-NSSAI 1 - 50 Mbps (default S-NSSAI for the PLMN)
  - NS#2: S-NSSAI 2 – 100 Mbps
  - NS#3: S-NSSAI 3 – 150 Mbps
  - NS#4: S-NSSAI 4 – 100 Mbps
  - NS#5: S-NSSAI 5 – 200 Mbps

310

The list of “Slice fallback mapping”, the slice mapping configure by OAM in NG-RAN would be

| Allowed S-NSSAI | Upgrade S-NSSAI |
|---|---|
| S-NSSAI 4 | S-NSSAI 3 (Higher priority)<br>S-NSSAI 5 |
| S-NSSAI 3 | S-NSSAI 5 |
| S-NSSAI 2 | S-NSSAI 3 |

FIG. 3

RAN CONGESTION MANAGEMENT AND SERVICE CONTINUITY WITH USER CONSENT OPTION

RELATED APPLICATION

This application was originally filed as PCT/EP2021/073866, filed on Aug. 30, 2021, of which claimed the benefit of priority of U.S. Provisional Patent Application No. 63/086,568, filed Oct. 1, 2020, which are incorporated herein by reference in their entirety.

FIELD

The subject matter described herein relates to wireless communications.

BACKGROUND

A network slice refers to a logical network that provides specific network capabilities and network characteristics. The network slice may be considered a logical end-to-end network that can be dynamically created, so that a given UE may access different network slices over the same radio access network (e.g., over the same radio interface). The network slices can provide different services and/or have different QoS needs/requirements. 3GPP TS 23.501, System Architecture for the 5G System, describes examples of network slices. The UE's configuration information (which may be provided by the network when registering in a PLMN) may include one or more network slice identifiers, such as one or more single NSSAIs (S-NSSAI). The S-NSSAI may be comprised of: a) a slice/service type (SST), which refers to the expected network slice behavior in terms of features and services; and/or b) a slice differentiator (SD), which is optional information that complements the Slice/Service type(s) to differentiate amongst multiple network slices of the same Slice/Service type.

SUMMARY

In some example embodiment, there may be provided a method comprising sending, by a user equipment, an indication of whether the user equipment supports an automatic re-mapping of a network slice to a fallback network slice; and receiving, by the user equipment, an acknowledgment from a network in response to the sent indication.

In some variations, one or more of the features disclosed herein including the following features can optionally be included in any feasible combination. The sending may further include sending a registration request message including the indication. The indication may include a first indication, a second indication, or a third indication. The first indication may indicate that automatic re-mapping is supported without a subsequent notification being sent to the user equipment when the re-mapping is performed by the network. The second indication may indicate that automatic re-mapping is supported with a subsequent notification being sent to the user equipment when the re-mapping is performed by the network. The third indication may indicate that re-mapping is supported in response to a consent by the user equipment before the re-mapping is performed by the network. In response to the third indication, the user equipment may receive a request message including a proposal to re-map one or more network slices to one or more fallback network slices, send a response to the proposal indicating the decision whether the proposal is accepted, and update a configuration of one or more network slices based on the proposal. The response may be sent in a response The request message may include a network access stratum message or radio resource control message. The user equipment may update the indication by registering with the network. The user equipment may receive a notification including a list identifying one or more network slices re-mapped by the network, the list identifying at least the fallback network slice automatically re-mapped by the network, the fallback network slice having an upgraded level of service or a downgraded level of service.

In some example embodiment, there may be provided a method comprising receiving an indication regarding a user equipment support of a network re-mapping from a network slice to a fallback network slice; storing the received indication in a context associated with the user equipment; and identifying a need to perform the re-mapping of the network slice for the user equipment.

In some variations, one or more of the features disclosed herein including the following features can optionally be included in any feasible combination. The indication may indicate that the user equipment supports the network applying the re-mapping automatically, and wherein the method may further include re-mapping, based on the received indication and the identifying, the network slice to the fallback network slice. There may also be provided reporting, based on a timer, a list to a core network node, the list identifying the user equipment re-mapped to the fallback network slice, wherein if the timer expires, the reporting is performed, and wherein if before the timer expires the times is re-set due to the returning to the network slice, the reporting is inhibited. The indication may be received from an access and mobility management function. The indication may further indicate the automatic re-mapping is allowed to proceed with a subsequent notice provided to the user equipment. The identifying may be in response to identifying a congestion condition associated with the network slice or the network slice being temporarily not available. A target radio access network may report the list to the core network node. The indication may indicate the user equipment requires consent before allowing the re-mapping of the network slice to the fallback network slice, wherein the method may further include: reporting the list to the core network node, the list identifying at least the user equipment allowing the re-mapping when consent is requested and provided by the user equipment; in response to receiving, from the core network node, the consent of the user equipment, modifying a context to allow the re-mapping of the network slice to the fallback network slice; and in response to not receiving the consent of the user equipment, inhibiting application of the re-mapping to the fallback network slice. Not receiving the consent may include receiving a denial of the consent or receiving no response regarding the consent of the user equipment before an expiry of a timer. The consent of the user equipment may be received from the core network node. The core network node may comprise an access and mobility management function. The re-mapping may be based on mapping information derived from configuration information received from an operation and maintenance node. The configuration information may map, for the user equipment, the network slice to one or more fallback network slices having an upgraded level of service or a downgraded level of service.

In some example embodiment, there may be provided a method comprising receiving, at a core network node, a notification from a radio access network node, the notification indicating that a user equipment has a network slice re-mapped to a fallback network slice; in response to the notification, starting, for the user equipment, a notification timer; in response to a further notification indicating a reversion from the fallback slice to the network slice before the expiry of the timer, inhibiting a slice re-mapping notification from being sent to the user equipment; and in response to a no further notification indicating the reversion from the fallback slice to the network slice before the expiry of the timer, sending the slice re-mapping notification to the user equipment.

In some variations, one or more of the features disclosed herein including the following features can optionally be included in any feasible combination. The notification may include a duration of the timer. The method may further include sending a message to obtain slice update assistance information for the user equipment based on subscription information for the user equipment; receiving a response message including the subscription information indicating whether the user equipment is allowed to automatically re-map the network slice or if consent is required by the user equipment prior to the re-map for the user equipment; and accessing a charging function to obtain charging information for the fallback network slice, wherein the charging information indicates a fee discount for a downgrade or a fee surcharge for an upgrade. The received notification may include a list of a plurality of user equipment, each of the plurality of user equipment is re-mapped to a corresponding fallback network slice, wherein a corresponding timer is set for each of the plurality of user equipment. The core network node may comprise an access and mobility management function.

In some example embodiment, there may be provided a method comprising receiving, at a core network node, a list from a radio access network node, the list including a user equipment that requires consent before network slice re-mapping is applied by the network; sending, by the core network node, a request towards the user equipment to get the consent; receiving, from the user equipment, a decision with respect to the consent; and updating, by the core network node, the radio access network node with the decision of the user equipment to enable the radio access network node to determine whether to proceed with applying the network slice remapping.

In some variations, one or more of the features disclosed herein including the following features can optionally be included in any feasible combination. The decision may be received in a direct response to the request or in subsequent registration procedure. The received list may include a plurality of user equipment that require consent before network slice re-mapping is applied by the network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 2 depicts an example of the network slicing mapping configuration information for fallback to a degraded capability for the network slice, in accordance with some example embodiments;

FIG. 3 depicts an example of the network slicing mapping configuration information for a fallback that represents an upgraded capability for the network slice, in accordance with some example embodiments;

Figure 1:
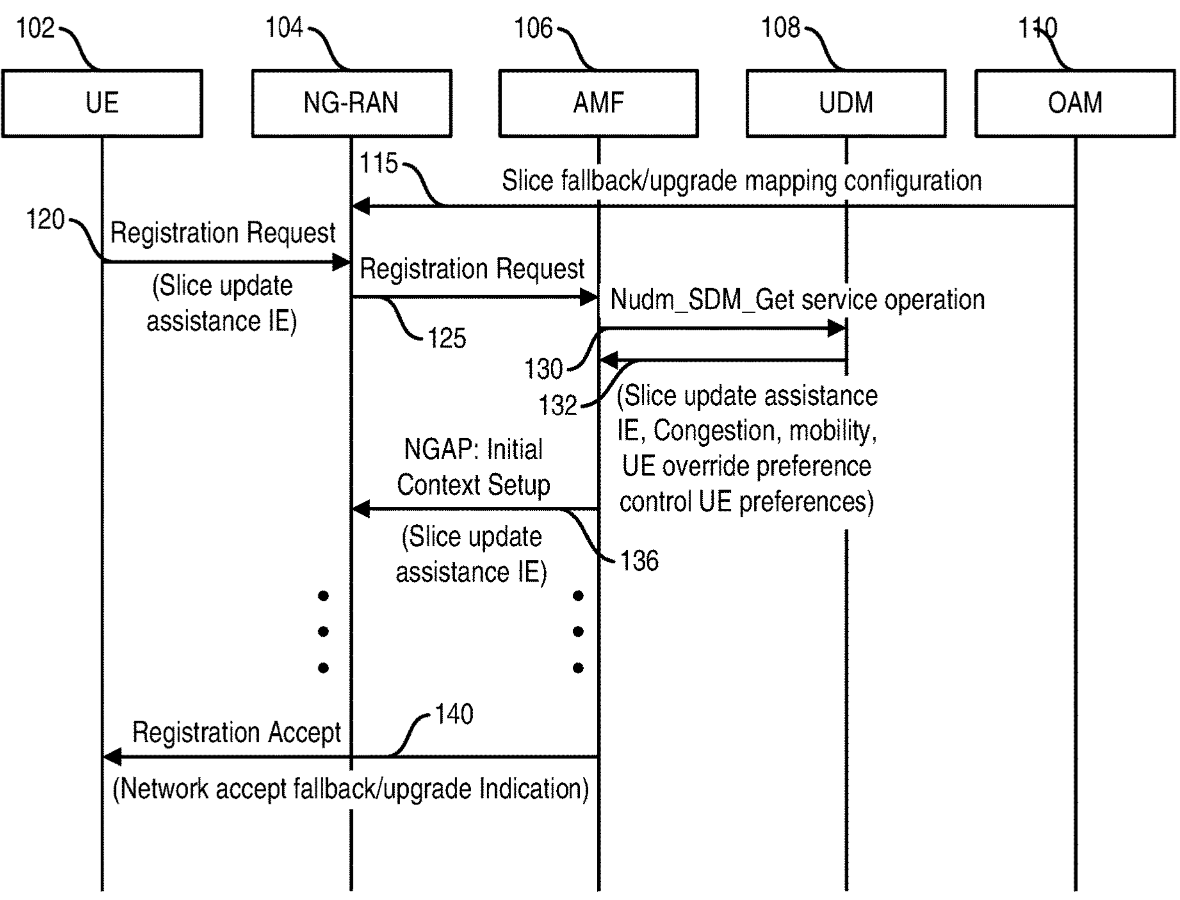
FIG. 1 depicts an example of a process for providing network slice assistance information, in accordance with some example embodiments.

Like labels are used to refer to same or similar items in the drawings.

DETAILED DESCRIPTION

Mobility may be made slice-aware in case of network slicing as described in, for example, 3GPP TS 38.300, section 16.3.4.5. The single-network slice selection assistance information (S-NSSAI) may be included as part the packet data unit (PDU) session information that is transferred during mobility signaling to enable slice-aware admission and congestion control.

When there is congestion for any specific S-NSSAI (and corresponding network slice identified by that S-NSSAI) in the RAN such as the NG-RAN, there may be no clear way to inform the rest of the system that the congestion is for a specific S-NSSAI and, as such, take one or more actions as a remedy. It would be desirable for the RAN to indicate to the core network that a network slice is congested and/or propose one or more alternative network slices for the user equipment (UE) to continue connectivity. These alternative, or fallback, network slices may be provisioned in the RAN by a node or a service, such as operations and maintenance (OAM) node or service.

At the RAN, congestion control may be managed at the QoS service flow level rather than at the network slice level. The QoS notification control feature may allow the provision of alternative QoS profiles, but an alternative includes keeping the same QoS or having a QoS different but still suitable for the SLA (service level agreement with the slice customer) and changing the network slice in the RAN only. In short, there is a potential that some unloaded but alternative network slices (which may be suitable substitutes with respect to the SLA, for example) in the RAN may be used for the subscriber to continue to receive service.

With respect to the need to support service continuity, for intra-radio access technology (RAT) handover service interruption (e.g., when a target gNB base station does not support the UE's ongoing network slice), there is a need for a mechanism for re-mapping, fallback, and data forwarding procedures.

In some example embodiments, the RAN, such as the NG-RAN or other type of RAN, may be configured with network slice mapping configuration information, an example of which is described below with respect to FIGS. 2 and 3. The network slice mapping configuration information maps a current network slice (or its S-NSSAI) with one or more alternative network slices (or the alternative S-NSSAIs) which can be used as a fallback. The RAN may receive this information from a network node or service, such as the OAM.

In some example embodiments, there is provided a network slice update assistance information element that indicates the UE's preference with respect to the network re-mapping an S-NSSAI to another, fallback S-NSSAI due to mobility, RAN congestion, and/or for other reasons. For example, the UE may indicate during registration (e.g., in a registration request to an Access and Mobility Management Function (AMF)) a slice update assistance information element. This slice update assistance information element may indicate one or more possible modes of operation for the UE with respect to the UE's consent to the use of alternative network slices.

In a first mode for example, the slice update assistance information element may indicate "automatic without notification" mode. When in this first mode, the UE supports an automatic network slice re-mapping by the RAN. In other words, the UE gives its consent in advance of any network or RAN slice re-mapping, which may result in re-mapping of the service to an alternative a network slice having a downgraded level of service or an upgrade of level of service, such as QoS, QoE, and/or the like. And while in this first mode, the network is not required to notify the UE of the re-mapping. This "automatic without notification" mode may be used in a variety of situations including during UE's mobility (e.g., handover) or when there is RAN congestion.

In a second mode, the slice update assistance information element may indicate automatic with notification. When in this second mode, the UE supports an automatic network slice re-mapping by the network or RAN but requests some form of notification be provided to the UE after the re-mapping is completed. For example, in the "automatic with notification" mode the UE may give its consent in advance for a downgrade and/or an upgrade with, however, a notification being sent to the UE. This notification may be sent to the UE after an expiry of a notification timer, although it may be sent at other times as well. In the case of a notification timer implementation for example, after the network re-maps the UE to an alternative network slice, if the UE is re-mapped again to its original (pre-re-mapping) network slice before the expiry of the notification timer, the network may stop the notification timer and not provide notification to the UE. If the network slices are not re-mapped to original network slices and the notification timer expires, the network (or a node therein such as the AMF) may notify the UE about the re-map to an alternative network slice (which may represent a downgrade or upgrade). This "automatic with notification" mode may also be used in a variety of situations including during a UE's mobility or a RAN's congestion. In some embodiments, the notification timer is located in the AMF, but in some other embodiments, the notification timer is located in the RAN, such as a gNB base station.

In a third mode, the slice update assistance information element may indicate "upon request". When in this third mode, the network asks the UE's consent before the network re-maps to an alternative network slice. Although this may be used in a variety of situations, it may be especially suited for when there is RAN congestion or temporary unavailability of a slice.

Although some of the examples describe the UE's indication with respect to network slice re-mapping in the context of the slice update assistance information element included in a registration request, the UE may convey to the network its preference(s) with respect to network slice re-mapping to the network in other ways as well (e.g., in other types of messages to the network).

In some example embodiments, the AMF may send to the RAN, such as a 5G gNB base station or other type of base station, the UE's network slice update assistance IE that indicates whether network slice re-mapping can proceed automatically with notification, automatically without notification, and upon request to the UE. The AMF may indicate this information to the RAN as part of an initial context setup request for a given UE or during connected node mobility in case of a change of RAN node. This information may be obtained during the UE's registration procedure with the network. Alternatively, or additionally, this information may be obtained from other sources, such as subscription information data obtain via the unified data management (UDM) node. The subscription information from the UDM may be, however, overridden by user equipment (UE) preferences if the UDM allows the UE to override portions of the subscription information. For example, the subscription information may include a bit to allow the UE to override aspects of the subscription information for mobility and RAN congestion. Thus, in some embodiments, the indication sent to the network about the first mode, second mode, and third mode may override, for the user equipment, a default configuration at the network for automatic re-mapping.

The subscription-based approach may be implemented with UEs that have little or no capability to signal to the network UE preferences in the registration request message, although the subscription-based approach may be implemented with other use cases as well.

In some example embodiments, the RAN may apply a default behavior (based on, for example, fairness), if the RAN does not receive the network slice update assistance IEs for a given UE. If the UE updates its network slice update assistance IE, the UE may do so (e.g., through another registration procedure which may be periodic or mobility based). In the case of congestion for example, when all of the QoS requirements cannot be fulfilled for one or more QoS flows, the priority level may be used to select for which QoS flows the QoS requirements are prioritized such that a QoS flow with priority level value N is prioritized over QoS flows with higher priority level values (e.g., N+1, N+2, and the like). By way of another example, services using Non-GBR QoS flows may be prepared to experience congestion-related packet drops and delays.

In case of RAN congestion for example or slice temporary not available, the RAN may send to the AMF a list of one or more UEs identified as subject for re-mapping of a given slice. This list notifies the AMF of the one or more UEs which are for example in the "automatic with (or without) notification" mode and have had their network slices re-mapped (e.g., upgraded or downgraded) to an alternative network slice. Alternatively, or additionally, this notification may also include the status of the congestion level of the network slices. The RAN's notification to the AMF may be via a next generation application protocol (NGAP), such as a slice congestion report which may be sent after the upgrade/downgrade occurred due to RAN congestion. This congestion status report may be used by the AMF in slice allocation for the new UEs registering in the tracking area handled by the AMF.

In case of mobility, a notification of a UE's network slice being downgraded or upgraded to an alternative network slice may be sent by a target RAN to a target AMF during mobility. This downgrade or upgrade may be performed when the target RAN experiences congestion and thus performs a network slice upgrade/downgrade as per the target RAN and UE's configuration (e.g., the network slice update assistance IEs).

As noted, the re-mapping of a network slice may be temporary, so if the network slice is re-mapped to its original values before the notification timer expires (as indicated by the RAN to the AMF), no further update/notification may be required by the network. If notification timer expires and re-mapping has not changed to original values, the AMF may notify the impacted UE's with a network access stratum message or command, such as a configuration update Command (in which case no specific consent from the UE is expected for this update).

In case of RAN congestion for example or slice temporary not available, for the UEs that are in the "upon request" mode, the RAN may notify the AMF by providing a list of one or more UEs (which are in the "upon request" mode) identified as subject to slice re-mapping (which may include the corresponding details of the re-mapping) and/or a grace timer for a response from the UE. This list may be provided to the AMF using a report, such as a slice congestion report, although it may be provided to the AMF in other ways as well.

For a UE, the AMF may send a message (e.g., a NAS configuration update command) to the UE to get the UE's consent before applying the slice re-mapping. The message may indicate the slice which is subject to the re-mapping, such as an upgrade or a downgrade. Alternatively, or additionally, the AMF may also indicate a fee discount for the downgrade or a fee surcharge for upgrade. The discount or surcharge information may be obtained from, for example, a Network Slice Selection Function or charging function if not available locally at the AMF. The AMF may also indicate a grace time during which the UE is required to provide a response to the request for consent. In some instances, the consent may require user interaction, so the grace period timer may be set to allow for that user interaction (e.g., 30 second more or less). The RAN may also be configured with a fee discount during a network slice downgrade and a fee surcharge during a network slice upgrade for each of the mappings (e.g., between a network slice and allowed alternative network slices). The fee discounts and surcharges may be configured in the AMF or the Network Slice Selection Function on a per-remapping pair basis between a network slice and an allowed alternative network slice. Alternatively, the discount or surcharge may be decided centrally, in which case the AMF may provide updates to the central location on the basis of the upgrade and downgrade pairs (e.g., after querying the CHF). The discount or surcharge values may have an expiration time, after which the values may be cleared from the AMF cache.

The AMF may indicate the network slice upgrade or downgrade with the surcharge or discount in the form of, for example, a text message displayed on the UE's user interface, such as a display, to enable selection of an "accept" or a "deny" of the re-mapping of the network slice to a downgraded or upgraded alternative network slice. If "accept" is selected at a given UE, the AMF updates the RAN about that UE's consent for slice re-mapping in a message, such as a context modification request (e.g., NGAP UE context modify request). If "deny" is selected or no action is taken at the UE within the specified grace time, the AMF may not inform the RAN and after expiry of the grace timer, the NG-RAN does not apply the network slice re-mapping but instead the RAN may apply a fairness treatment to the UE without any slice re-mapping (e.g., may need to degrade the QoS or release the associated PDU session).

The UE may indicate its decision to "accept" or "deny" by sending a response message back, such as a UE configuration complete message, to the AMF after the user equipment selection (e.g., "accept," "deny," or no action) and the UE configuration complete message contains the UE response "accept" or "deny". The timer of the UE configuration update procedure may be adapted to the grace timer. Alternatively, the UE may indicate its decision to "accept" or "deny" in a subsequent registration procedure. In that case the UE immediately sends back the UE configuration update complete message, without the UE's decision, then within the grace timer indicated in a NAS message such as a configuration update command, the UE may trigger a registration procedure to indicate the UE decision "accept" or "deny" to the slice re-mapping.

For a UE, the RAN may also request network slice re-mapping consent directly using, for example, a radio resource control (RRC) message between the RAN and the UE. Based on a given UE's response/decision, the RAN may apply a slice re-mapping.

FIG. 1 depicts an example of a process for providing network slice assistance information, in accordance with some example embodiments. FIG. 1 depicts a UE 102, a NG-RAN 104 (e.g., a gNB 5G type base station or other type of base station), and core network nodes, such as an AMF 106, a UDM 108, and an OAM node or service 110.

In the example of FIG. 1, the network slice assistance information may be configured (e.g., set) in an information element, such as a network slice assistance IE during a UE's registration process with the network. Based on the UE's network slice assistance information for example, the RAN 104 may re-map a given UE, such as UE 102, from a first network slice to a second slice to provide service connectivity instead of just dropping the first network slice. This re-mapping may be considered a downgrade in service (e.g., with a lower service level agreement, QoE, and/or the like) or an upgrade in service (e.g., with a higher service level agreement, QoE, and/or the like), although the re-mapping may still be considered compatible or acceptable with the original service level agreement (SLA). The RAN may apply the slice re-mapping based on the UE's slice update assistance IE, which may be negotiated by the UE and the AMF at, for example, the time of the UE's registration.

During registration, the UE may indicate its preference to operate in the modes noted above (e.g., in automatic with notification, automatic without notification, and upon request). Alternatively, the UE's preference to operate in these modes may be obtained from subscription information available via the UDM. Furthermore, the AMF may indicate support of slice updates for the UE in the NGAP initial context setup request message to the RAN in message 136.

At 115, a core network node, such as the OAM 110, may provide to the RAN 104 network slice mapping configuration information. This information may include mappings between a network slice and alternative network slices which may be used as a fallback (and may cause an upgrade or downgrade in service). Examples of the mapping configuration information are described further below with respect to FIGS. 2 and 3.

FIG. 2 depicts an example of the network slicing mapping configuration information for fallback to a degraded capability for the network slice, in accordance with some example embodiments. As noted, the OAM (or other core network node) may provide, at 115, this network slicing mapping configuration information for fallback to the RAN 104. In the example of FIG. 2, the UE 120 (labeled "UE1") has subscribed to 5 network slices each of which is identified with an S-NSSAI as shown at 205. At 210, the network slicing mapping configuration information shows the mapping between the UE's subscribed network slice and allowed, alternative network slices (which may still be considered compatible or acceptable with the original service level agreement, for example). For example, the S-NSSAI 5 is mapped to fallbacks S-NSSAI 4 and S-NSSAI 3, while S-NSSAI 4 is mapped to fallback S-NSSAI 1.

FIG. 3 depicts an example of the network slicing mapping configuration information for a fallback that represents an upgraded capability for the network slice, in accordance with some example embodiments. In the example of FIG. 3, if the UE has capability to automatically update with or without consent to a better QoE and indicated this as part of the registration, the RAN may re-map the existing session(s) to slices with higher QoE. As noted, the OAM (or other core network node) may provide, at 115, this network slicing mapping configuration information 305 and/or 310 to the RAN 104. In the example of FIG. 3, the UE 120 (labeled "UE1") has subscribed to 5 network slices as shown at 305. The slice mapping which are allowed for each network slice is shown at 310. For example, the S-NSSAI 4 (which has a GBR of 100 Mbps) is mapped to fallbacks S-NSSAI 3 (which has a GBR of 150 Mbps) and S-NSSAI 5 (which has a GBR of 200 Mbps), both of which represents upgraded fallbacks.

Referring again to FIG. 1, the UE may send, at 120, to the RAN 104 an indication representative of a capability for slice fallback and/or subscription for slice fallback. Alternatively, or additionally, this indication may include an indication of the mode of the slice fallback, such as automatic without notification, automatic with notification, or upon request. In some example embodiments, the indication is included in an information element, such as the slice update assistance IE. Moreover, the indication may, as shown at 120, may be sent as part of the UEs registration request message, although other types of messages may be used to carry the UE's preference for slice re-mapping to the RAN (e.g., via subscription information).

At 125, the RAN 104 may forward towards the core network node, such as the AMF 106, the registration request (or the information included in the registration request). This registration request may indicate to the AMF that it should get the UE's slice update assistance IEs from UDM based on UE subscription 9 (in other words, the UDM would have the same content as the slice update assistance IE). The AMF may obtain the slice update information from the UDM as well. To that end, FIG. 1 at 130 shows the AMF 106 sending a message to the UDM 108 to get (e.g., request, obtain, and the like) the slice update assistance information based on the UE's subscription.

The UDM may responds at 132 with subscription information which may indicate whether the slice update to upgrade or downgrade a slice is enabled automatically without notification, automatically with notification, or upon request and whether the slice updating is enabled for congestion and/or mobility. As noted, the subscription from UDM may be overridden by user preferences only if the UDM is enabled to allow an override. The UDM may provide the information if not provided by UE.

At 136, the AMF 106 may send a message to indicate to NG-RAN the slice update assistance IE for the UE. This message may be sent as part of an NGAP initial context setup request sent by the AMF to the RAN 104. At 140, the AMF acknowledges the support for slice fallback and auto-upgrade feature in registration accept message, which is sent to the UE 102.

Figure 4A:
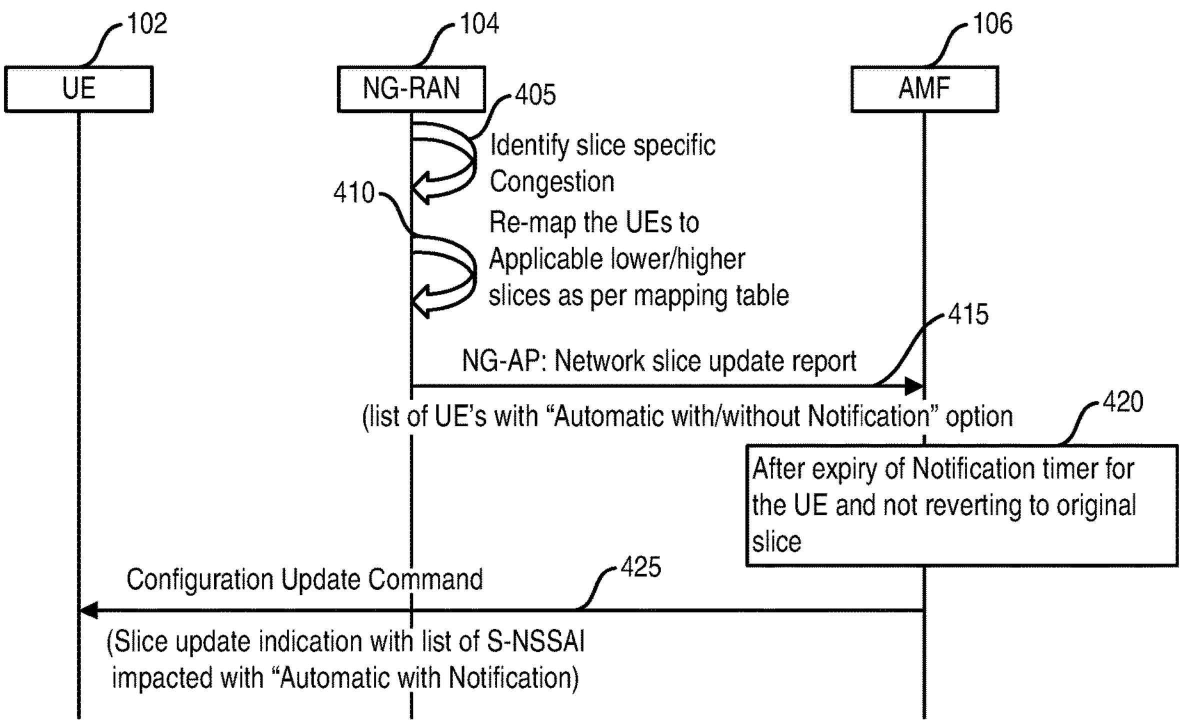
FIGS. 4A and 4B depict examples of processes for slice re-mapping associated with congestion control, in accordance with some example embodiments.

FIG. 4A depicts an example of a process for slice re-mapping associated with congestion control, in accordance with some example embodiments.

At 405, the RAN 104 may identify congestion associated with a network slice or temporary unavailability of a slice. For example, a specific network slice may be encountering congestion. At 410, the RAN 104 may automatically re-map one or more UE(s) associated with the identified congestion to other network slices. Based on the UE's mode (e.g., automatic with notification) and the network mapping configuration information, the RAN may re-map to an alternative network slice representative of a downgrade to a lower QoE or QoS network slice or representative of an upgrade to a higher QoE or QoS network slice. Referring again to FIG. 3, if network slice 3 (labeled #3) at 205 experiences congestion, the RAN may re-map to another network, which in this example is a downgrade to an S-NSSAI 2.

When the RAN 104 identifies slice specific congestion dynamically at 405 for example, the RAN may evaluate slice mapping configuration information (e.g., 210, 310, and the like) to assess the re-map, at 410, to an applicable lower or higher slices while taking into account the slice update assistance IE for a given UE. As noted, the slice update assistance IE for a given UE indicates the UE's consent for re-mapping (e.g., automatically with notification, automatically without Notification, or upon request).

Upon NG-RAN 104 identifying slice specific congestion dynamically, the RAN 104 may look at slice mapping information (see, e.g., FIGS. 2 and 3) to re-map the UEs to applicable lower/higher slices considering the slice update assistance IE of individual UE's, which had opted for "automatic with notification" or "automatic without notification."

At 415, the RAN 104 may send to AMF 106 a message including updated information about the list of one or more UEs that are re-mapped to alternative slices (e.g., UEs which had opted for automatic with notification or without notification). This message may be a NGAP message, such as a network slice report update containing a list of re-mapped one or more UEs.

After expiry of a notification timer for a given UE at 420, if the network slice is not re-mapped to its original values (e.g., before the re-map), the a network node, such as a RAN node or an AMF, may notify, at 425, the involved, re-mapped UEs (which had opted for automatic with notification) about the service update with impacted slice information through a NAS message, such as a configuration update command message.

Figure 4B:
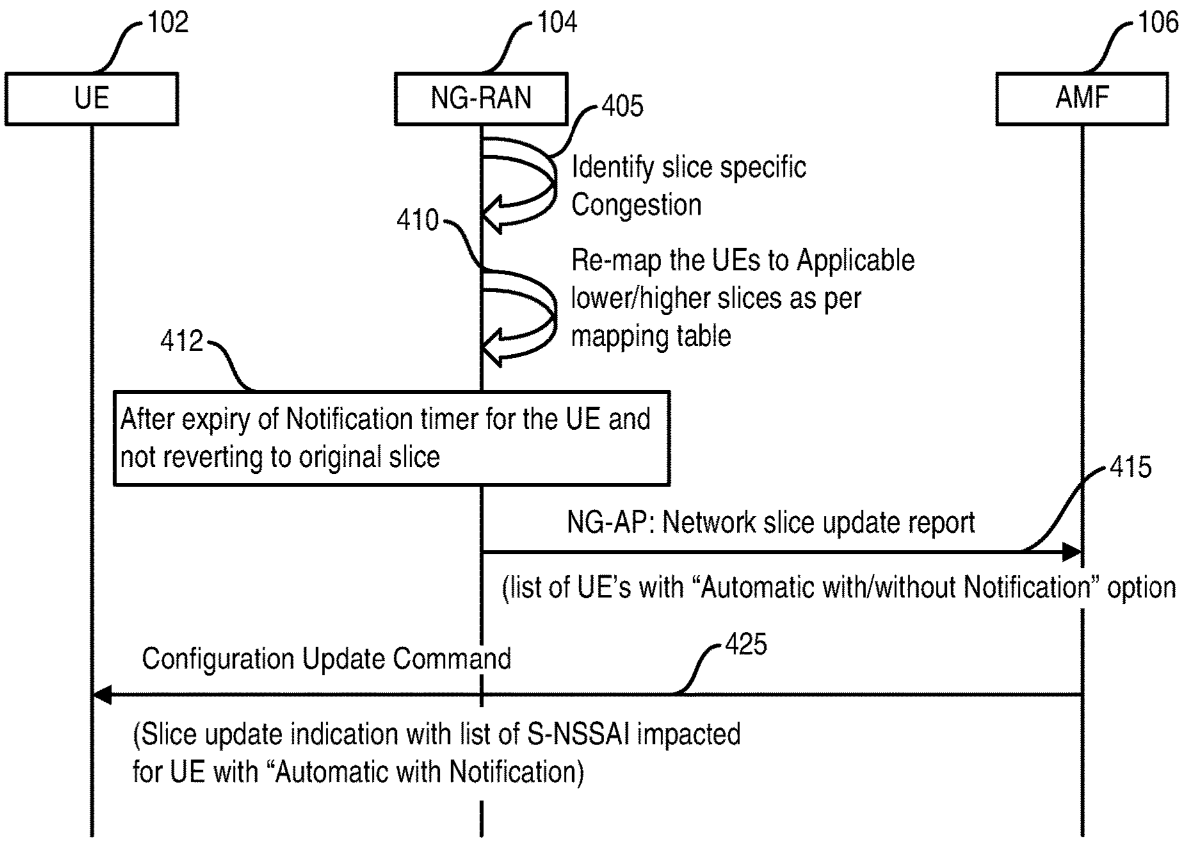

FIG. 4B depicts another example of a process for slice re-mapping associated with congestion control, in accordance with some example embodiments. FIG. 4B is similar to FIG. 4A but places the notification timer at the NG-RAN (e.g., a base station, such as a gNB type base station). In the example of FIG. 4B, if the network slice is not re-mapped to its original network slice(s) (e.g., before the re-map) before the expiry of the notification timer (412) such that the fallback network slice(s) are still being used by the UE, the notification is provided to a core network nodes, such as the AMF 106, at 415.

Figure 5:
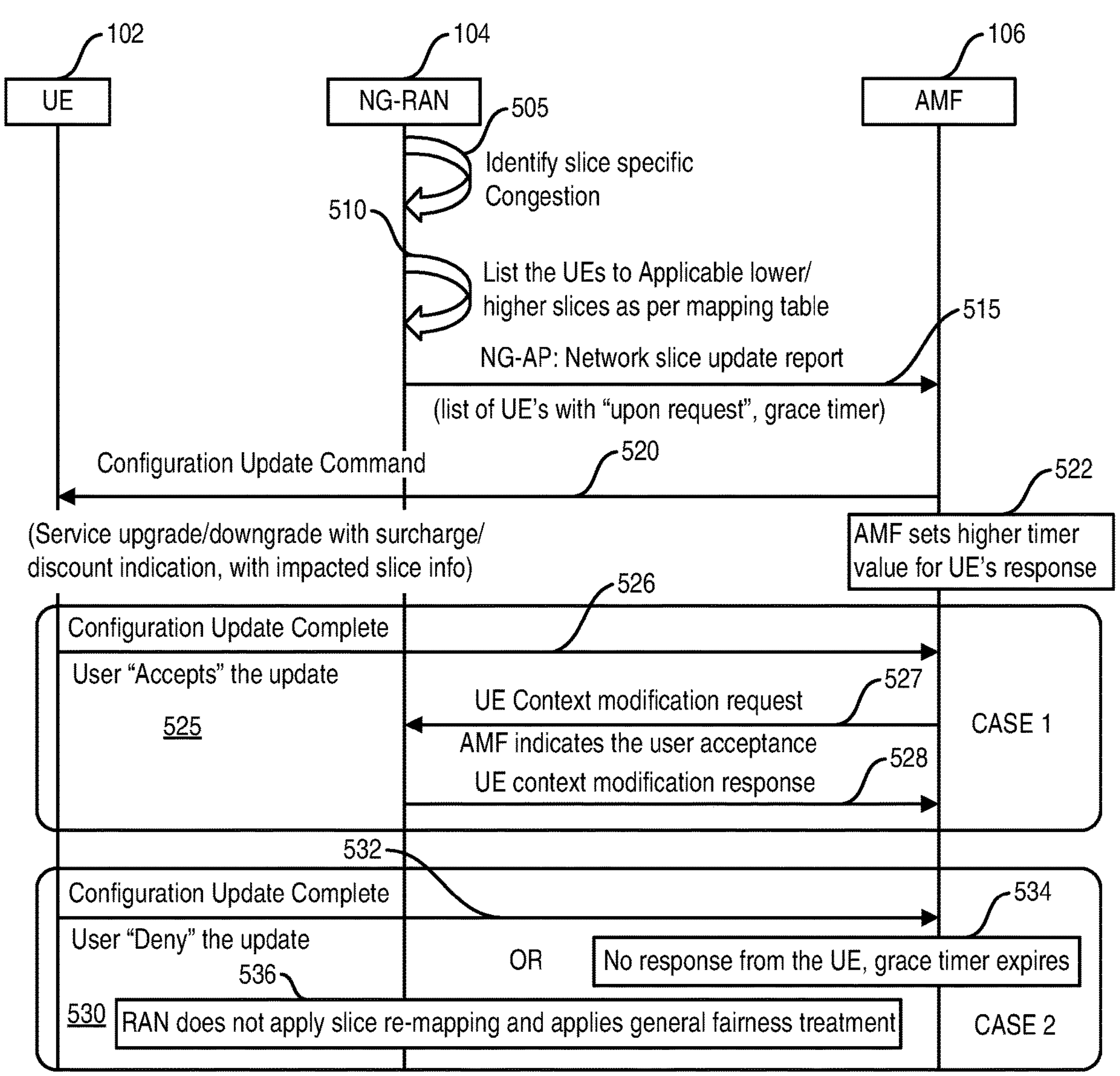
FIG. 5 depicts an example of a process for slice re-mapping for a UE configured to allow re-mapping of network slices in an "upon request" mode.

FIG. 5 depicts an example of a process for slice re-mapping for a UE configured to allow re-mapping of network slices in an "upon request" mode.

At 505, the RAN 104 may identify congestion associated with a network slice or a slice temporary not available. For example, a specific network slice may be encountering congestion.

At 510, the RAN 104 may identify one or more UEs that are subject to re-mapping to other network slices. As noted, the RAN may evaluate slice mapping configuration information to evaluate whether the specific network slice may be re-mapped to an alternative network slice (which may represent a downgrade or an upgrade in the service) while taking into account the slice update assistance IE indicating the UE's consent for re-mapping of slice by the network.

At 515, the RAN 104 may update the AMF 106 by sending a message indicating a list of one or more UEs which are subject to re-mapping and have allowed re-mapping in the "upon request" mode (which requires some form of UE consent before applying the re-mapping). This message may take the form of a NGAP message, such as a network slice report update containing the list of UEs which have opted for "upon request."

At 520, the AMF 104 may notify the one or more UEs 102 (which have opted "upon request") about the service update related to the proposed re-mapping of network slices. The notification may take the form of a configuration update command, although other types of message may be used as well. In some embodiments, the notification is associated with, or includes, a response (or grace) timer value, during which the UE is supposed to accept the re-map or deny the re-map. In the example of FIG. 5, the response timer may be set higher to allow the UE (or its associated timer) to respond with the accept or deny, when compared to a timer used with the automatic modes noted herein or compared to a legacy timer of configuration update command procedure.

If the user equipment 102 (or end user associated with the user equipment) accepts 525 the updated configuration (which re-maps the network slice to another slice), the UE sends, at 526, a configuration update complete message to inform the AMF about the acceptance. The AMF 106 may then update, at 527, the NG-RAN 104 about the UE's consent to apply the re-mapping with a message (e.g., NGAP: UE context modification procedure). At 528, the RAN acknowledges the request received at 527.

At 530, if the user equipment 102 (or end user associated with the user equipment) denies the update at 532 or does not respond so the grace timer expires at 534, no update is done from AMF 106 to NG-RAN 104, so the RAN 104 does not apply the slice re-mapping at 536 (although the RAN may apply a general fairness principle instead).

Figure 6:
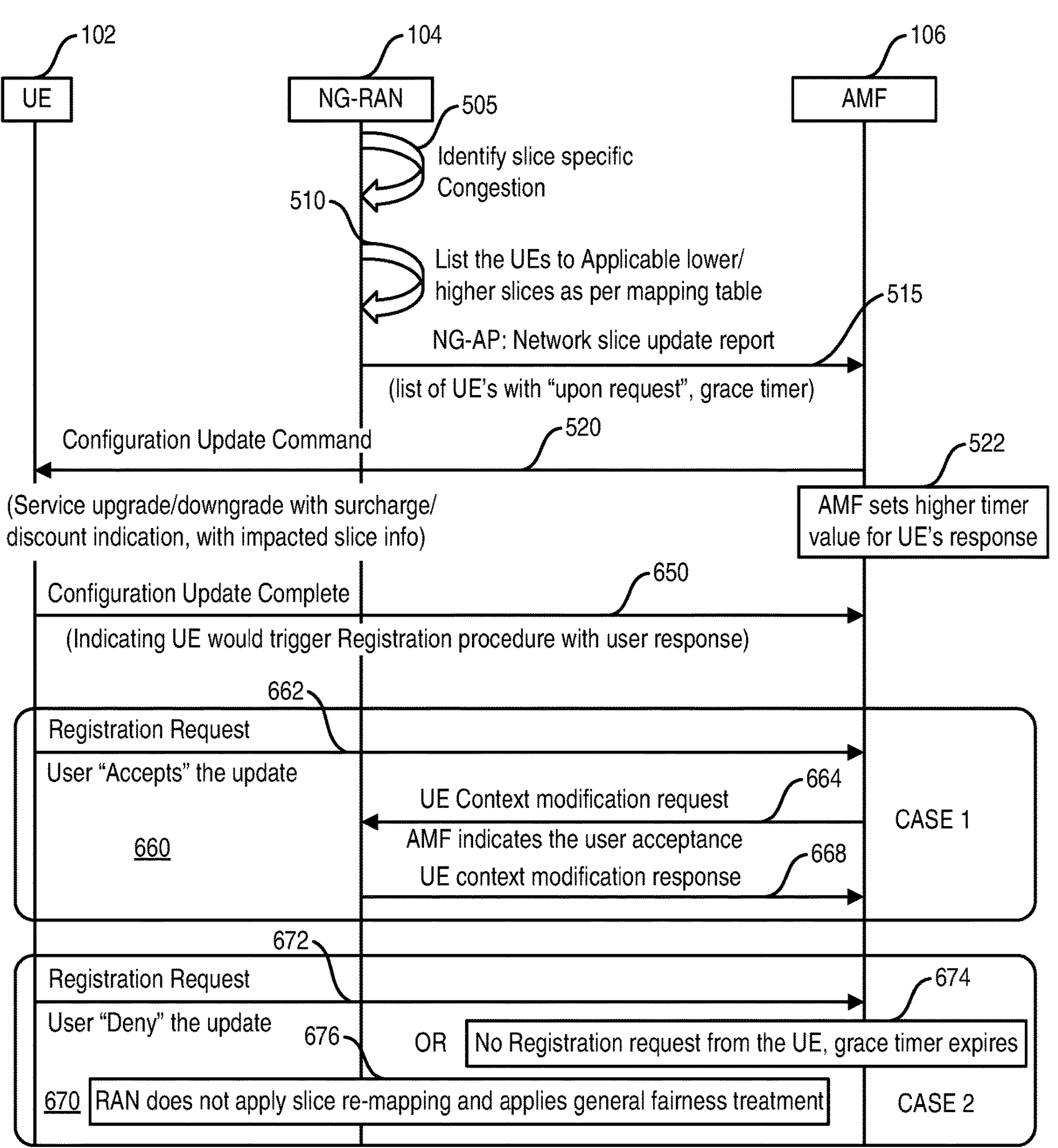
FIG. 6 depicts an example of a process for slice re-mapping for a UE configured to allow re-mapping of network slices "upon request," in accordance with some example embodiments.

FIG. 6 depicts an example of a process for slice re-mapping for a UE configured to allow re-mapping of network slices "upon request," in accordance with some example embodiments. FIG. 6 is similar in some respects to FIG. 5. But after 520 at FIG. 6, the UE 102 (or associated user) acknowledges the reception of the configuration update command immediately by sending a response at 650, such as the configuration update complete message and the UE will trigger a registration procedure to notify of its response/decision (accept or deny) concerning the re-mapping.

If the user equipment 102 (or associated end user) accepts at 660 the request, the user equipment triggers at 662 a registration procedure indicating the acceptance of the update in the registration request message. In response, the AMF 105 updates the RAN 104 about the UE's consent to apply the re-mapping with a message at 664, such as an NGAP UE context modify request, which the RAN acknowledges at 668 with a response, such as a UE context modify response.

If the user equipment (or associated user) denies at 670 the update as indicated in the registration request message 672 or the UE 102 does not respond within the grace timer expiry (674), no update is done from the AMF 106 to the NG-RAN 104 as shown at 676. Upon expiry of the grace timer, the NG-RAN may infer that UE has not accepted the update and accordingly does not wish to do the re-mapping so the RAN will not apply the re-mapping and may apply instead a general fairness principle.

Figure 7:
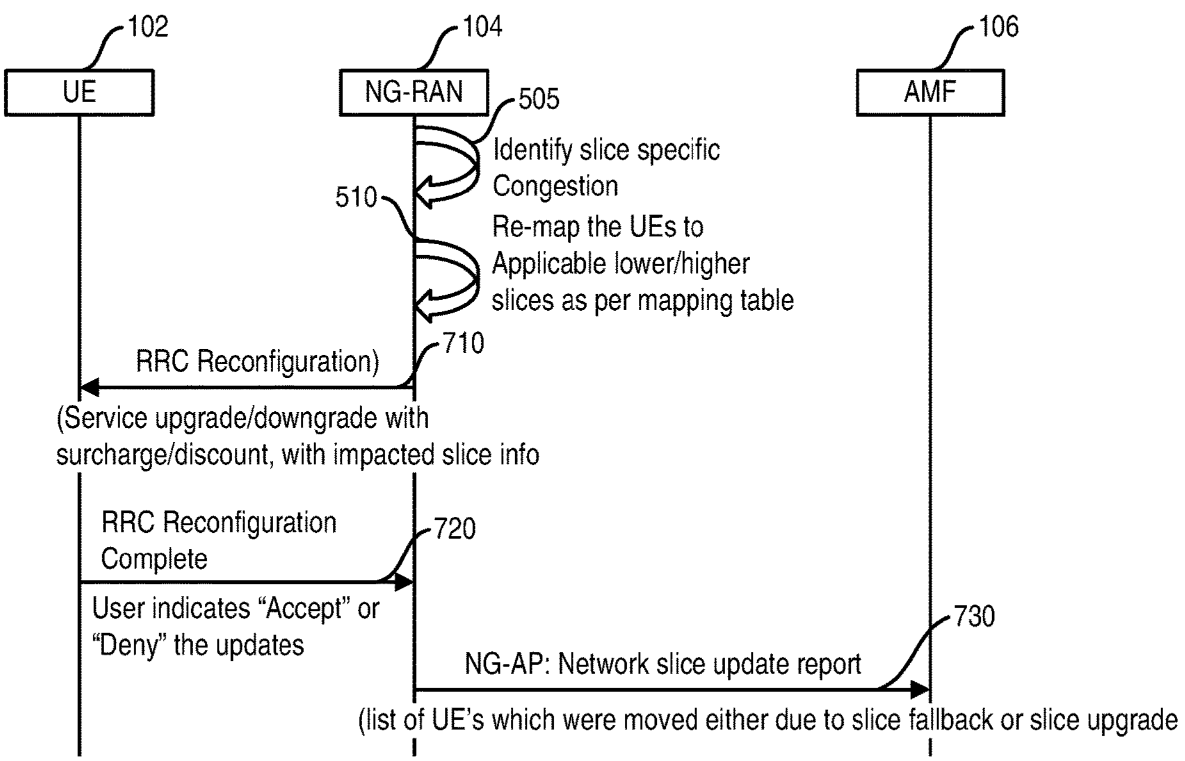
FIG. 7 depicts another example of a process for slice re-mapping for a UE configured to allow re-mapping of network slices "upon request," in accordance with some example embodiments.

FIG. 7 depicts an example of a process for slice re-mapping for a UE configured to allow re-mapping of network slices "upon request," in accordance with some example embodiments. FIG. 7 is similar in some respects to FIG. 5. But in the case of FIG. 7, the RRC messages are used directly with one or more UEs to obtain consent to re-mapping the network slices.

Upon NG-RAN 104 identifying slice specific congestion or slice temporary not available at 505, the RAN 104 evaluates at 510 the slice mapping information to re-map the one or more UEs to an allowed lower or higher slices taking into account the slice update assistance IE, for example. At 710, the RAN 104 may then directly inform the UE about the slice re-map update in order to receive the UE's consent with direct messaging, such as RRC message (e.g., a RRC reconfiguration request message). For example, the message at 710 may represent a request sent by the RAN and received by the UE. This request represents a proposal to re-map one or more network slices to one or more fallback network slices.

At 720, the UE 102 responds with an accept or a deny. This response may be sent directly to the RAN 104 in an RRC message, such as an RRC reconfiguration complete message. For example, the user equipment may send a response to the proposal indicating the decision whether the proposal is accepted. At 730, the RAN 104 (e.g., a RAN node, such as a gNB type base station or other types of base station as well) may send to AMF 106 (or other core network node) a message including updated information about the list of one or more UEs that are re-mapped to alternative slices (e.g., UEs which had opted for upon consent). This message may be a NGAP message, such as a network slice report update containing a list of re-mapped one or more UEs. This information may be used for, among other things, surcharges and discounts associated with the fallback slice.

If the response indicated accepts, the RAN is allowed to re-map, at 730, the slice for the UE. If the response indicates deny, the RAN is not allowed to re-map, at 730, the RAN may apply general fairness principles.

Figure 8A:
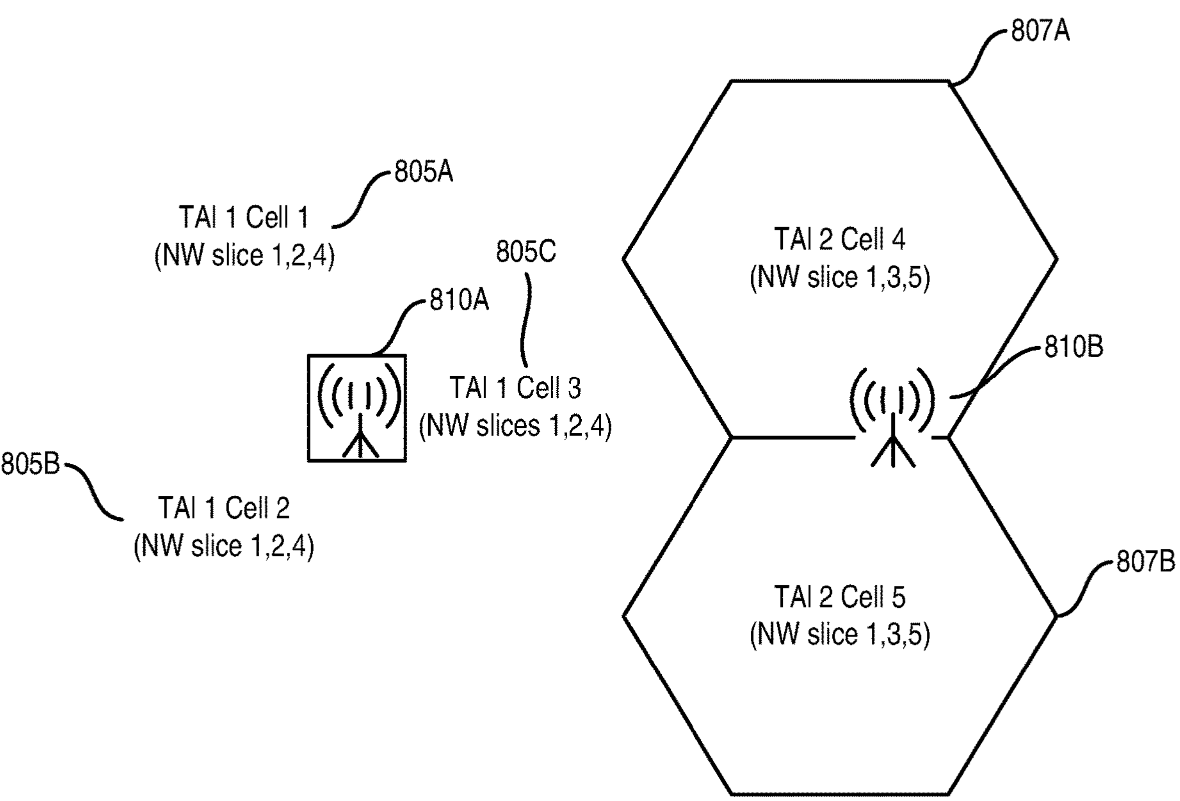
FIG. 8A depicts cells, in accordance with some example embodiments.

FIG. 8A depicts five cells (labeled cells 1-5), each of which is labeled with a tracking area identifier (TAI) as well as network slices for the cells. In the example of FIG. 8A, a first RAN 810A may serve tracking area identifier (TAI) 1, which includes cells 805A-C. And, a second RAN 810B may serve tracking area identifier (TAI) 2, which includes cells 807A-B. The allowed network slices in TAI 1 are network slices 1,2 and 4, and the allowed network slices in TAI 2 are network slices 1, 3 and 5.

Figure 8B:
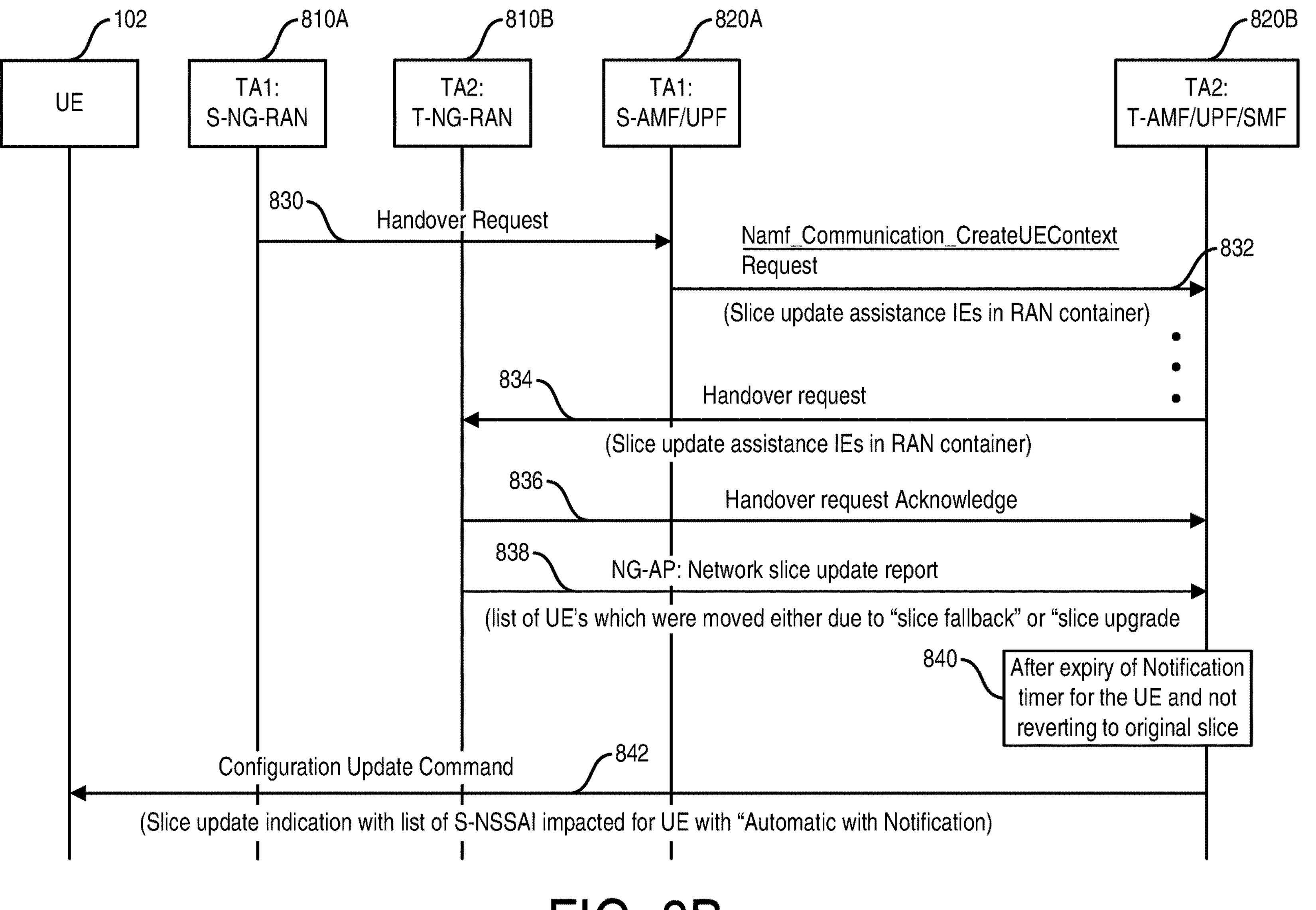
FIGS. 8B and 8C depict examples of processes for use of slice update assistant information for a UE configured with "automatic with notification," in accordance with some example embodiments.

FIG. 8B depicts an example of a process for use of slice update assistant information for a UE configured with "automatic with notification," in accordance with some example embodiments. FIG. 8B includes a UE 102 which undergoing a handover process from a serving TAI 1 provided by serving RAN 810A to a target TAI 2 provided by a target RAN 810B. FIG. 8B also depicts the serving-AMF and/or UPF for TAI 1 820A and the target AMF and/or UPF for TAI 2 820B.

At 830, a serving RAN 810A sends a handover request the serving AMF 820A. The handover request includes the slice update assistance IE information, such as automatic with notification, automatic without notification, and upon request (which refers to obtaining the UE's consent when a situation such as congestion causes a need for a request re-mapping to a fallback).

The serving AMF 820A transfers, at 832, the UE's 102 slice update assistance IE in a container (labeled a RAN container) to the target AMF 820B, which then provides, at 834, the container to the target RAN 810B. The target RAN 810B sends an acknowledgement at 836.

Based on the current traffic load and slice mapping configuration from OAM, the target RAN 810B may decide the applicable RAN slice for the incoming UE while taking into account the received slice update assistance IE, which is set in this example to automatic with notification. The target RAN 810B may then update the target AMF 820B about the UE re-mapping to an alternative slice by (1) including the updated slice information in the handover request acknowledge message at 836 (or handover notify message). Alternatively, the target RAN 810B may then update the target AMF 820B about the UE re-mapping to an alternative slice by (2) including the updated slice in another type of message, such as a NGAP network slice report update as shown at 838.

If the slices are re-mapped to original values, the notification timer is stopped for the UE, in which case no further action by the network. If slices are not re-mapped to original slices and after expiry of notification timer for the UE at 840, the target AMF 820B (or a target RAN node, such as a gNB) sends a message at 842 to notify the involved UEs about the service update for those UEs with the configuration "automatic with notification" with UE configuration update command, for example.

Figure 8C:
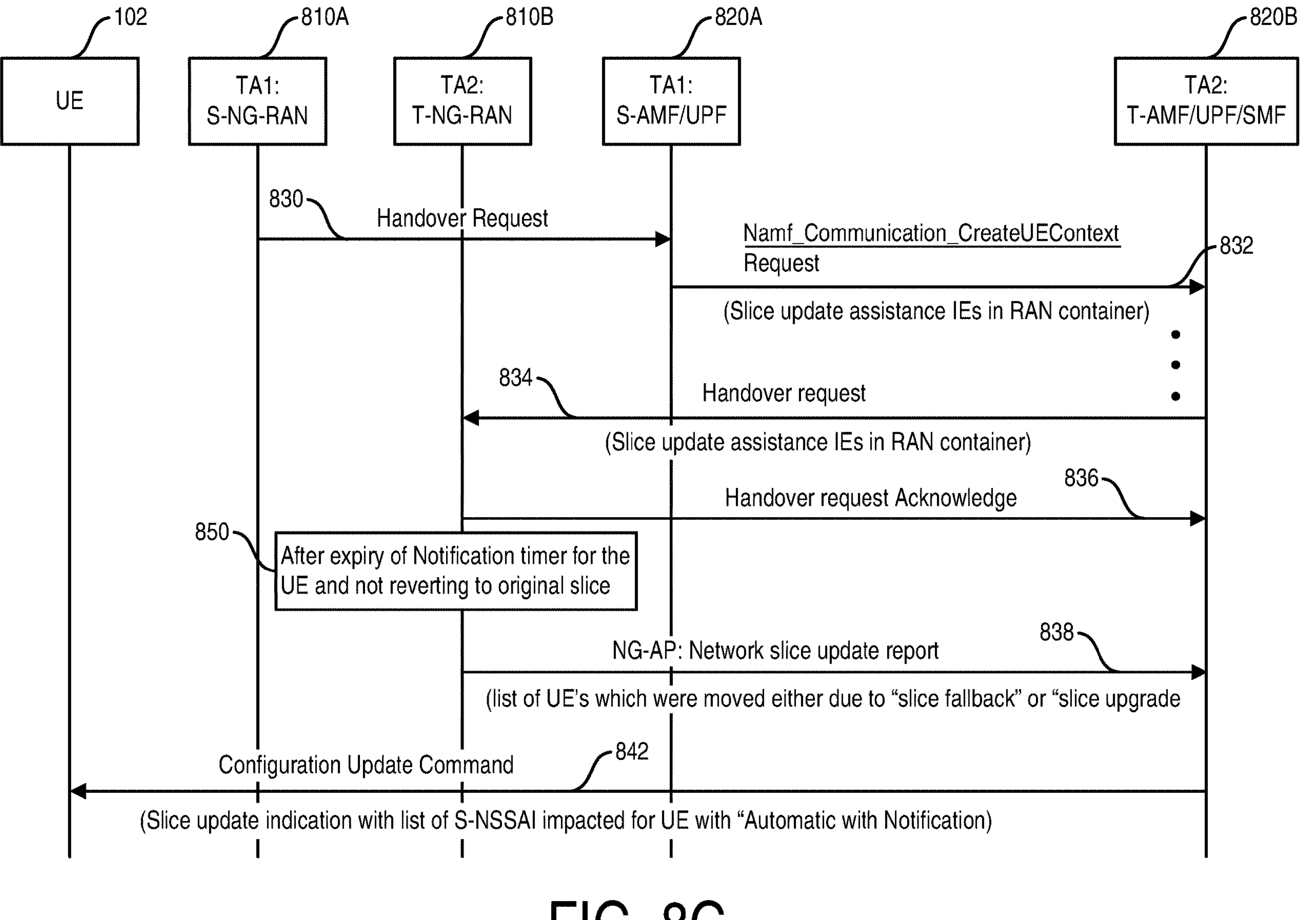

FIG. 8C depicts another example of a process for use of slice update assistant information for a UE configured with automatic re-mapping (with or without a preference for notification), in accordance with some example embodiments. FIG. 8C is similar to FIG. 8B in some respects but the notification timer expiry 850 is at the target RAN 810B. In the example of FIG. 8C, if the network slice is not re-mapped to its original network slices before the expiry of the notification timer (850) such that the fallback network slice(s) are still being used by the UE, the target RAN 810B may then update the target AMF 820B about the UE re-mapping to an alternative slice by including the updated slice in a message as shown at 838, although the information about the alternative slice may be carried by other messages as well.

Figure 9:
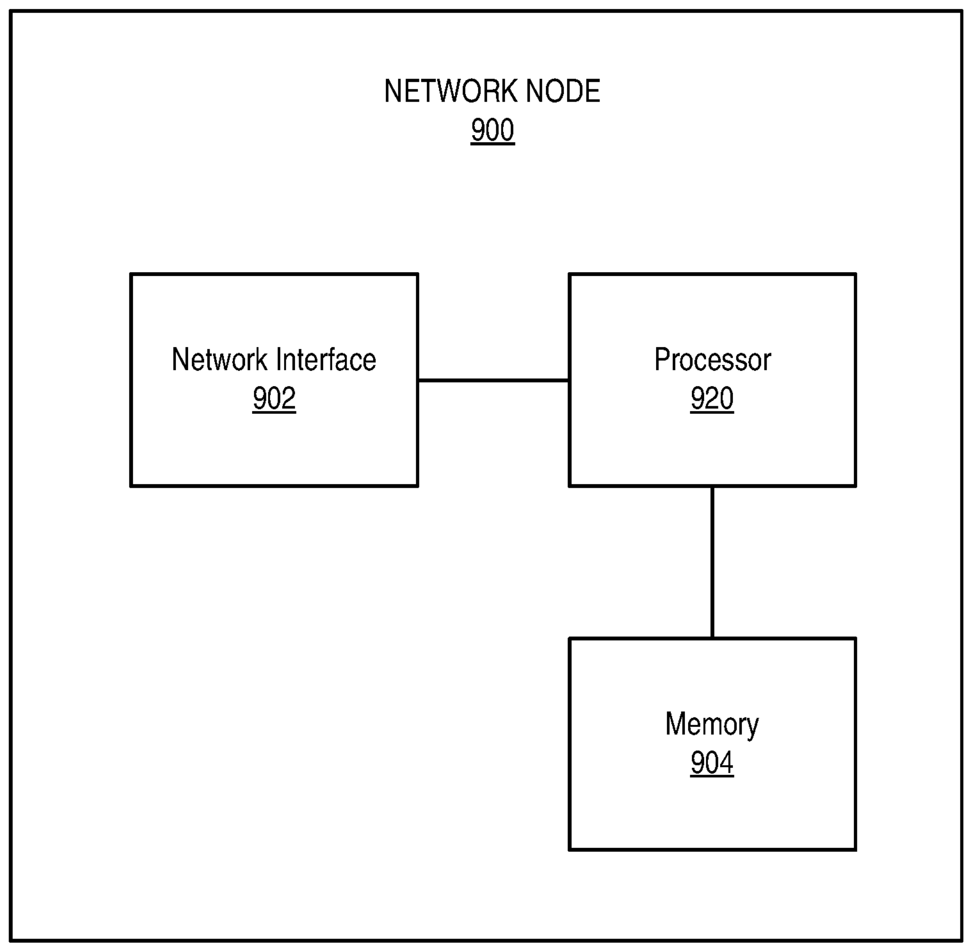
FIG. 9 depicts an example of a network node, in accordance with some example embodiments.

FIG. 9 depicts a block diagram of a network node 900, in accordance with some example embodiments. The network node 900 may be configured to provide one or more network side functions, such as a base station (e.g., gNB), AMF, UPF (user plane function), SMF (session management function), UDM, CCF, and/or other network nodes.

The network node 900 may include a network interface 902, a processor 920, and a memory 904, in accordance with some example embodiments. The network interface 902 may include wired and/or wireless transceivers to enable access other nodes including base stations, other network nodes, the Internet, other networks, and/or other nodes. The memory 904 may comprise volatile and/or non-volatile memory including program code, which when executed by at least one processor 920 provides, among other things, the processes disclosed herein with respect to the network nodes (see, e.g., processes at FIGS. 1, 4-7, and 8B and/or the like).

For example, in some embodiments, the network node may comprise or be comprised in a radio access network node, such as a NG-RAN, base station, gNB base station, and/or the like. For example, the network node, such as the radio access network node may be configured to receive an indication regarding a user equipment support of a network re-mapping from a network slice to a fallback network slice and store the received indication in a context associated with the user equipment; and identifying a need to perform the re-mapping of the network slice for the user equipment. The indication may indicate that the user equipment supports the network applying the re-mapping automatically, and wherein the method may further include re-mapping, based on the received indication and the identifying, the network slice to the fallback network slice. The network node, such as the radio access network node may be configured report, based on a timer, a list to a core network node, the list identifying the user equipment re-mapped to the fallback network slice, wherein if the timer expires, the reporting is performed, and wherein if before the timer expires the times is re-set due to the returning to the network slice, the reporting is inhibited. The indication may be received from an access and mobility management function. The indication may further indicate the automatic re-mapping is allowed to proceed with a subsequent notice provided to the user equipment. The identifying may be in response to identifying a congestion condition associated with the network slice or the network slice being temporarily not available. A target radio access network may report the list to the core network node. The indication may indicate the user equipment requires consent before allowing the re-mapping of the network slice to the fallback network slice, wherein the network node, such as the radio access network node may be further configured to: report the list to the core network node, the list identifying at least the user equipment allowing the re-mapping when consent is requested and provided by the user equipment; in response to receiving, from the core network node, the consent of the user equipment, modify a context to allow the re-mapping of the network slice to the fallback network slice; and in response to not receiving the consent of the user equipment, inhibit application of the re-mapping to the fallback network slice. Not receiving the consent may include receiving a denial of the consent or receiving no response regarding the consent of the user equipment before an expiry of a timer. The consent of the user equipment may be received from the core network node. The core network node may comprise an access and mobility management function. The re-mapping may be based on mapping information derived from configuration information received from an operation and maintenance node. The configuration information may map, for the user equipment, the network slice to one or more fallback network slices having an upgraded level of service or a downgraded level of service.

For example, in some embodiments, the network node may comprise or be comprised in a core network node, such as a AMF or other type of network node. When this is the case, the network node may be configured to receive a notification from a radio access network node, the notification indicating that a user equipment has a network slice re-mapped to a fallback network slice; in response to the notification, start, for the user equipment, a notification timer; in response to a further notification indicating a reversion from the fallback slice to the network slice before the expiry of the timer, inhibit a slice re-mapping notification from being sent to the user equipment; and in response to a no further notification indicating the reversion from the fallback slice to the network slice before the expiry of the timer, send the slice re-mapping notification to the user equipment. Moreover, the notification may include a duration of the timer. The network node may be configured to send a message to obtain slice update assistance information for the user equipment based on subscription information for the user equipment; receive a response message including the subscription information indicating whether the user equipment is allowed to automatically re-map the network slice or if consent is required by the user equipment prior to the re-map for the user equipment; and access a charging function to obtain charging information for the fallback network slice, wherein the charging information indicates a fee discount for a downgrade or a fee surcharge for an upgrade. The received notification may include a list of a plurality of user equipment, each of the plurality of user equipment is re-mapped to a corresponding fallback network slice, wherein a corresponding timer is set for each of the plurality of user equipment. The core network node may comprise an access and mobility management function.

In some embodiments, the network node may comprise or be comprised in a core network node, such as a AMF or other type of network node, configured to at least receive a list from a radio access network node, the list including a user equipment that requires consent before network slice re-mapping is applied by the network; sende a request towards the user equipment to get the consent; receive, from the user equipment, a decision with respect to the consent; and update, by the core network node, the radio access network node with the decision of the user equipment to enable the radio access network node to determine whether to proceed with applying the network slice remapping. The decision may be received in a direct response to the request or in subsequent registration procedure. The received list may include a plurality of user equipment that require consent before network slice re-mapping is applied by the network.

Figure 10:
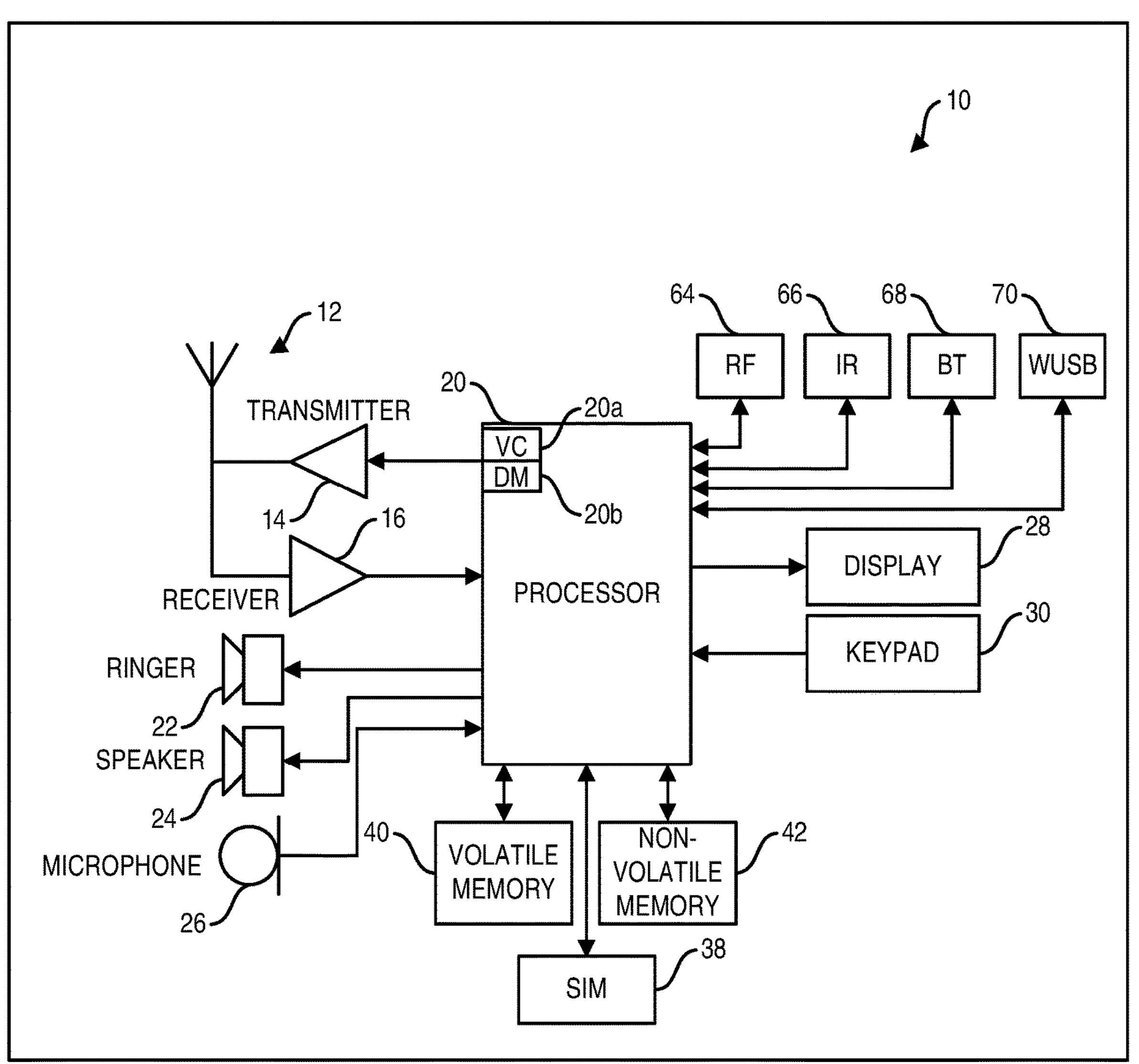
FIG. 10 depicts an example of an apparatus, in accordance with some example embodiments.

FIG. 10 illustrates a block diagram of an apparatus 10, in accordance with some example embodiments.

The apparatus 10 may represent a user equipment, such as the user equipment 102 and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 10 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 10, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

In some example embodiment, the apparatus may comprise or be comprised in a user equipment. For example, the apparatus may be configured to send an indication of whether the user equipment supports an automatic re-mapping of a network slice to a fallback network slice and receive an acknowledgment from a network in response to the sent indication. Moreover, the apparatus may be configured to send a registration request message including the indication. The indication may include a first indication, a second indication, or a third indication. The first indication may indicate that automatic re-mapping is supported without a subsequent notification being sent to the user equipment when the re-mapping is performed by the network. The second indication may indicate that automatic re-mapping is supported with a subsequent notification being sent to the user equipment when the re-mapping is performed by the network. The third indication may indicate that re-mapping is supported in response to a consent by the user equipment before the re-mapping is performed by the network. In response to the third indication, the apparatus, such as the user equipment, may receive a request message including a proposal to re-map one or more network slices to one or more fallback network slices, send a response to the proposal indicating the decision whether the proposal is accepted, and update a configuration of one or more network slices based on the proposal. The response may be sent in a response. The request message may include a network access stratum message or radio resource control message. The apparatus, such as the user equipment, may update the indication by registering with the network. The apparatus, such as the user equipment, may receive a notification including a list identifying one or more network slices re-mapped by the network, the list identifying at least the fallback network slice automatically re-mapped by the network, the fallback network slice having an upgraded level of service or a downgraded level of service.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 7, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be maintaining service by enabling use of an upgraded or downgraded slice to avoid service discontinuity.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprised in a radio access network node, the apparatus comprising:

at least one processor; and at least one memory including computer program code, the at least one memory and the computer program code configured to, with the at least one processor, cause the apparatus to at least:

receive a first indication regarding a user equipment support of a network re-mapping from a network slice to a fallback network slice, the first indication indicating a mode of operation, from among a plurality of different modes of operation, for the user equipment with respect to the network re-mapping from the network slice, wherein the mode of operation indicated by the first indication is an automatic without notification mode of operation in which the apparatus is not required to notify the user equipment of a network re-mapping from the network slice;

store the received first indication in a context associated with the user equipment;

identify a need to perform the network re-mapping from the network slice by identifying the network slice being temporarily not available;

apply, automatically and without notifying the user equipment, the network re-mapping from the network slice to a fallback network slice having an upgraded level of service or a downgraded level of service;

configure a fee surcharge or a fee discount for the upgraded level of service or the downgraded level of service, respectively;

revert the user equipment from the fallback network slice to the network slice based on the network slice being available;

receive a second indication regarding the user equipment support of the network re-mapping from a network slice, the second indication indicating a mode of operation, from among the plurality of different modes of operation, for the user equipment with respect to the network re-mapping from the network slice, wherein the mode of operation indicated by the second indication is an automatic with notification mode of operation;

store the received second indication in the context associated with the user equipment;

identify a need to perform the network re-mapping from the network slice by identifying the network slice being temporarily not available;

apply, automatically, the network re-mapping from the network slice to a fallback network slice having an upgraded level of service or a downgraded level of service;

start a notification timer;

in case the user equipment is re-mapped from the fallback network slice back to the network slice before expiry of the notification timer, stop the notification timer and not provide any notification to the user equipment;

in case the user equipment is not re-mapped from the fallback network slice back to the network slice and the notification timer expires:

notify the user equipment about the network re-mapping from the network slice to the fallback network slice; and configure a fee surcharge or a fee discount for the upgraded level of service or the downgraded level of service, respectively;

revert the user equipment from the fallback network slice to the network slice based on the network slice being available;

receive a third indication regarding the user equipment support of the network re-mapping from a network slice, the third indication indicating a mode of operation, from among the plurality of different modes of operation, for the user equipment with respect to the network re-mapping from the network slice, wherein the mode of operation indicated by the third indication is an upon request mode of operation in which the user equipment requires consent before allowing the network re-mapping of the network slice to the fallback network slice;

store the received third indication in a context associated with the user equipment;

identify a need to perform the network re-mapping from the network slice by identifying the network slice being temporarily not available;

requesting consent from the user equipment to allow the network re-mapping of the network slice to the fallback network slice;

starting a grace timer;

in response to receiving the consent of the user equipment before expiry of the grace timer:

modify a context to allow the network re-mapping of the network slice to the fallback network slice;

apply the network re-mapping from the network slice to a fallback network slice having an upgraded level of service or a downgraded level of service; and configure a fee surcharge or a fee discount for the upgraded level of service or the downgraded level of service, respectively; and in response to a denial of the request or not receiving the consent of the user equipment before expiry of the grace timer, inhibit application of the network re-mapping to the fallback network slice.

* * * * *